United States Patent Office 2,830,931
Patented Apr. 15, 1958

2,830,931

PROCESS OF REMOVING COLORED IMPURITIES FROM HEPARIN

Eric Arthur Burfoot, Ruddington, James Ernest Hatchett, Fishpool, near Mansfield, and Leslie William Robinson, Carlton, England, assignors to Boots Pure Drug Company Limited, Nottingham, England, a British company No Drawing. Application June 28, 1954
Serial No. 439,916

Claims priority, application Great Britain March 19, 1954

3 Claims. (Cl. 167—74)

This invention relates to improvements in the production of heparin salts and has for its object the provision of a process for the removal of colored impurities from heparin salts and also a process for the removal of pyrogens from heparin salts.

Heparin is believed to be a mixture of polysulphuric esters of mucoitin and is a very valuable anticoagulant which is extensively used in clinical medicine. Free heparin is acidic in nature and is generally isolated in the form of its salt with an alkali metal, for example, in the form of its sodium salt. Heparin is generally supplied to the medical profession as a solution of the sodium salt which is yellowish or brown in color. It has long been felt desirable to eliminate this coloration and various methods have been investigated with a view to treating the heparin salt to obtain a product which would give a colorless solution.

We have now found that the colored impurities in heparin salts may be removed rapidly and efficiently without substantial loss of potency of the heparin by the process which is to be described hereinafter. Heparin may be isolated from animal lung tissue by processes of extraction and purification which are well known in the art. The end product of these processes is an off-white or buff colored powder. According to the process of our invention the colored powder (which is normally of a potency of approximately 100 u./mg.) is dissolved in water to give a solution containing approximately 5000 u./cc. and the solution so obtained is treated at an elevated temperature, preferably at approximately 80° C. and at a pH which is preferably within the range of 8.0 to 8.5, with a solution of a salt of permanganic acid. The salt of permanganic acid which is used will be determined partly by the nature of the cation which is required to be present in the salt of heparin finally obtained. Heparin is normally prepared in the form of its sodium salt and accordingly for the preparation of this salt sodium permanganate would be employed in the above process. It will be understood however that the invention is not limited to the use of the sodium salt of permanganic acid.

The quantity of permanganate which is required to effect the decolorisation is subject to variation according to the particular batch of heparin salt which is being decolorised. The precise quantity to be employed may be determined by treating aliquots of each batch of heparin salt with increasing quantities of permanganate solution until an amount of permanganate solution is determined which is just sufficient to effect decolorisation under the conditions hereinbefore described. We have found that in general where sodium permanganate is employed it is necessary to use approximately 1 gram-mole of permanganate in order to decolorise 100 million units of heparin salt.

The length of time for which the reaction is allowed to proceed varies according to the nature of the particular batch of heparin salt which is being treated but it is found that under the conditions herein outlined decolorisation of the heparin salt solution is complete within 15 to 30 minutes of the addition of the permanganate solution. It is found that little or no loss of potency of the heparin occurs during this period of time.

The range of pH within which the reaction is conducted has been found to be critical. Thus if the pH is significantly below 8.0 it is found that decolorisation of the heparin salt can be effected only with difficulty or not at all whilst if the pH is substantially higher than 8.5 the decolorisation is accompanied by a marked loss of heparin due to degradation. We have found that the reaction is preferably conducted under conditions such that the initial pH of the reaction mixture is within the range 8.0–8.5.

The temperature at which the reaction is performed is also of importance. We have found that if the reaction takes place at room temperature the resulting manganese dioxide is deposited in the form of very fine particles which are extremely difficult to separate by filtration. In fact the manganese dioxide may be deposited in colloidal form and may be so difficult to remove that contamination of the isolated heparin salt occurs.

If however, the reaction is performed at an elevated temperature the manganese dioxide is deposited in granular form and is easily removed from the product. We have found that the reaction is most conveniently conducted at a temperature of approximately 80° C. but it will be understood that our invention is not limited to the use of this particular reaction temperature.

When the decolorisation of the heparin salt solution has been effected in the manner described above, the liberated manganese dioxide is isolated by filtration and solid heparin salt is recovered from the filtrate by methods which are well known in the art. Thus, for example, the aqueous filtrate may be poured into an excess of alcohol when the heparin salt is precipitated as a white solid and may be collected and dried.

Accordingly our invention consists in a process for the removal of colored impurities from a salt of heparin which is characterised by the step of reacting an aqueous solution of a heparin salt at a pH within the range of 8.0 to 8.5 and at an elevated temperature, preferably at approximately 80° C., with an aqueous solution of a salt of permanganic acid, the cation of which salt is preferably identical with the cation of the heparin salt which is finally to be isolated, in such an amount as is hereinbefore defined.

The decolorisation of heparin in the manner described above also serves partially to remove pyrogens. In order to ensure complete removal of pyrogen from the heparin salt it is necessary to subject the material to a further process, which process also forms part of our present invention. We have found that the satisfactory removal of pyrogen from heparin salts which have been decolorised by treatment with permanganate can be effected by allowing an aqueous solution of the heparin salt of a concentration of the order of 40% w./v. to stand for a prolonged period of time, preferably in excess of 48 hours, at a pH within the range of 8.0 to 8.5 and a temperature within the range of 0° C. to 5° C. This treatment results in the deposition of a small amount of precipitate which may be removed by filtration. The filtrate may, if necessary, be subjected to further storage under the above conditions before being treated by methods well known in the art to recover a solid heparin salt therefrom.

It will be understood that whilst this method of removing pyrogens is particularly convenient to employ for heparin salts which have previously been decolorised by the method hereinbefore described, it may also be applied to heparin salts which have not been treated in this manner.

Accordingly our invention also consists in a process for removing pyrogens from a salt of heparin which may optionally have been decolorised by the method hereinbefore described, characterised by the steps of maintaining a heparin salt in aqueous solution at a pH within the range 8.0–8.5 and a temperature within the range of 0° C. to 5° C. for a prolonged period of time, preferably at least 48 hours, separating the precipitate which is so formed, and if necessary subjecting the filtrate to a further period of treatment under the conditions hereinbefore described.

The following non-limitative example illustrates the invention.

Example 300 g. of heparin (in the form of its sodium salt) of a potency of 100 u./mgm. is dissolved in 4 litres of distilled water and the solution is filtered through a bed of kieselguhr, the kieselguhr being washed several times with small portions (100 cc.) of distilled water. The volume of the combined filtrate and washings is adjusted to 6 litres by the addition of distilled water and the solution is rapidly heated to 80° C. The pH of the hot solution is adjusted to 8.0–8.5 by the addition of 5 N sodium hydroxide solution and 100 cc. of a 40% w./v. solution of sodium permanganate is added with vigorous stirring. The solution is allowed to stand for 30 minutes and the temperature is maintained at 80° C. The product is cooled to approximately 40° C., and the manganese dioxide which has separated is isolated by filtration through a bed of kieselguhr. The kieselguhr filter bed is suspended in 1 litre of distilled water and is heated to 80° C. the pH being adjusted to 8.0–8.5 if necessary. The suspension is cooled to 40° C. and is filtered, the filter bed being washed with 2 portions each of 250 cc. of distilled water. The filtrate is combined with that from the main bulk of the reaction and the solution is adjusted to pH 6.5. To the solution is added sufficient sodium chloride to produce a concentration of 1% in the final solution. The solution so obtained is clarified by filtration and the filtrate is poured with stirring into four times its volume of 95% alcohol. The solid which separates is isolated by filtration and is dried in vacuo at 35° C. There is thus obtained heparin (as the sodium salt) in the form of a white powder which has an activity of approximately 100 u./mg.

In order to remove pyrogens from this product, the heparin is dissolved in sufficient pyrogen-free distilled water to give a 40% w./v. solution. The pH of the solution is adjusted to 8.0–8.5. Sufficient cresol is added to produce a concentration of 0.3% w./v. in the solution and the later is allowed to stand at a temperature of 0° C. to 5° C. for 48 hours. The clear supernatant liquor is decanted and is filtered through a bed of kieselguhr which has previously been washed with acid and heated to 600° C. The filtrate is subjected to a test for the presence of pyrogens. If the test be satisfactory the solution is filtered sterile, the concentration of the solution is adjusted until the required potency (e. g. 5000 u./cc. or 1000 u./cc. according to the preparation which it is desired to market) is obtained and the solution is filled into ampoules.

We claim:

1. A process for the removal of colored impurities from a salt of heparin comprising the steps of heating the heparin to a temperature within the range 60 to 90° C. in aqueous medium in the presence of a salt of permanganic acid and separating the liquid from precipitated managanese compounds.

2. A process as claimed in claim 1, in which the heparin salt solution is brought to a pH within the range of 8.0 to 8.5, and in which sodium permanganate is present in quantity of the order of 1 gram mole per 100,000,000 units of heparin.

3. A process as claimed in claim 1 in which, after the removal of the colored impurities and separation from the precipitate, the heparin salt is held in an aqueous medium at a concentration of at least 40% w./v. for at least 48 hours at a temperature between 0° C. and 5° C. and then separated from the precipitate which is formed to remove pyrogens therefrom.

References Cited in the file of this patent

UNITED STATES PATENTS 2,134,679    Allen _____ Nov. 1, 1938

OTHER REFERENCES

Charles et al.: Jour. Biol. Chem., vol. 102, 1933, pp. 439–441.

The U. S. Dispensatory, 24th ed., 1947, Lippincott Co., Phila., pp. 930 and 931.

Remington's Practice of Pharm., 9th ed., 1948, Mack Publ. Co., Easton, Pa., pp. 249 and 250.